(12) United States Patent
Embree

(10) Patent No.: US 7,872,364 B1
(45) Date of Patent: Jan. 18, 2011

(54) FLUID DRIVEN ENERGY GENERATOR

(76) Inventor: Wayne Embree, 3925 Green Hill St., Bakersfield, CA (US) 93306

(*) Notice: Subject to any disclaimer, the term of this patent is extended or adjusted under 35 U.S.C. 154(b) by 31 days.

(21) Appl. No.: 12/583,116

(22) Filed: Aug. 15, 2009

(51) Int. Cl.
*F03B 13/00* (2006.01)
*F03D 13/00* (2006.01)

(52) U.S. Cl. .................................... 290/44; 290/43

(58) Field of Classification Search ............. 290/43, 290/44, 54, 55; 415/4.5, 4.2, 2.1, 132 B, 415/4.1, 3.1, 126, 129, 224; 60/497, 496; 416/119, 117, 1, 87, 88, 204 R, DIG. 4, 101
See application file for complete search history.

(56) References Cited

U.S. PATENT DOCUMENTS

| 2,023 | A | * | 3/1841 | Hobday | 416/101 |
|---|---|---|---|---|---|
| 21,432 | A | * | 9/1858 | May | 416/101 |
| 350,257 | A | * | 10/1886 | Lay | 416/101 |
| 515,883 | A | * | 3/1894 | Pelletier | 440/92 |
| 574,848 | A | * | 1/1897 | Kellogg | 416/86 |
| 858,215 | A | * | 6/1907 | Robinson | 416/101 |
| 1,543,004 | A | * | 6/1925 | Goodding | 416/101 |
| 2,041,103 | A | * | 5/1936 | Zegers | 416/101 |

OTHER PUBLICATIONS

U.S. Appl. No. 12/315,146, Embree.

* cited by examiner

*Primary Examiner*—Julio Gonzalez
(74) *Attorney, Agent, or Firm*—Dennis W. Beech

(57) ABSTRACT

The present invention may be used for converting fluid flow into an alternate energy form. A generally cylindrical enclosure may have a side wall with a plurality of slots longitudinally formed therein and with two opposed ends. Two drive members of a shaft may be spaced apart, positioned longitudinally on a centerline, and rotatably attached each to one of the two opposed ends. Each of the two drive members at an interior end may have an orthogonal member attached and a paddle shaft may be attached at a leverage end of the orthogonal members. Multiple paddles may be circumferentially spaced and radially attached at a first edge to rotate on the paddle shaft with an outer edge disposed to allow extension and retraction through one of the slots.

10 Claims, 3 Drawing Sheets

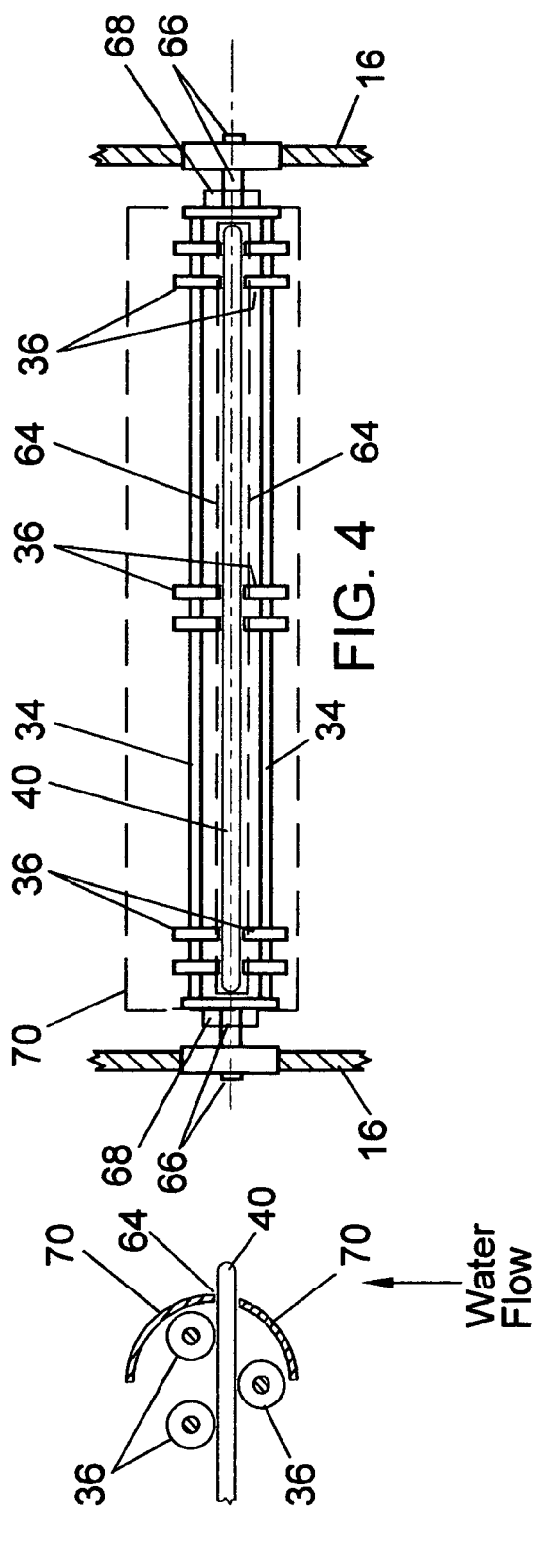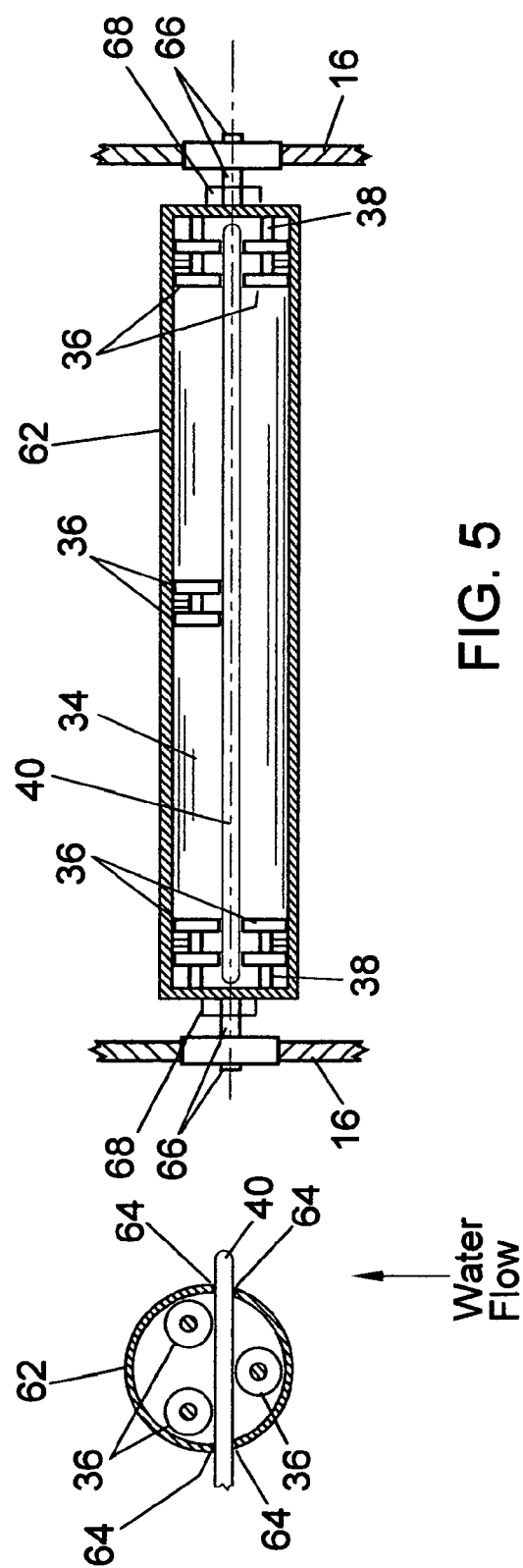

US 7,872,364 B1

FLUID DRIVEN ENERGY GENERATOR

BACKGROUND OF THE INVENTION

This invention relates to apparatus for generating energy from wind and water flow. The new generator may have a generally cylindrical enclosure with a paddle shaft rotatably positioned therein to alternately extend and retract paddles through slots in the enclosure wall.

Various wind and water flow driven energy generating devices and apparatus may be known. Such apparatus may involve a paddle wheel rotatably mounted on a shaft and structure. The paddle wheel may or may not be mounted in an enclosure. Those apparatus that include an enclosure may have an opening or duct that may allow fluid flow to impact paddles or blades to rotate the paddle wheel to power a coupled power generating device, such as an electric generator. The enclosure may be designed to have an opening in a wall to allow flow into the enclosure and against the paddles during only a portion of the paddle wheel rotation. Alternative paddle wheels may have paddles rotatably attached on circumferentially space frames such that the paddles rotate against the frames to cause rotation of the paddle wheel in one direction and rotate away from the frames to float in the fluid flow to not create drag or oppose the rotation of the paddle wheel in the desired direction.

SUMMARY OF THE INVENTION

The present invention is directed to apparatus for converting fluid flow into an alternate energy form. A generally cylindrical enclosure may have a side wall with a plurality of slots longitudinally formed therein and with two opposed ends. Two drive members of a shaft may be spaced apart, positioned longitudinally on a centerline, and rotatably attached each to one of the two opposed ends. Each of the two drive members at an interior end may have an orthogonal member attached and a paddle shaft may be attached at a leverage end of the orthogonal members. Multiple paddles may be circumferentially spaced and radially attached at a first edge to rotate on the paddle shaft with an outer edge disposed to allow extension and retraction through one of the slots.

These and other features, aspects and advantages of the present invention will become better understood with reference to the following drawings, description and claims.

BRIEF DESCRIPTION OF THE DRAWINGS

FIG. 4 illustrates an end view of a paddle with thrust shaft according to an embodiment of the invention;

FIG. 5 illustrates an end view of a paddle with thrust shaft and bracket arms according to an embodiment of the invention;

DETAILED DESCRIPTION

Figure 1:
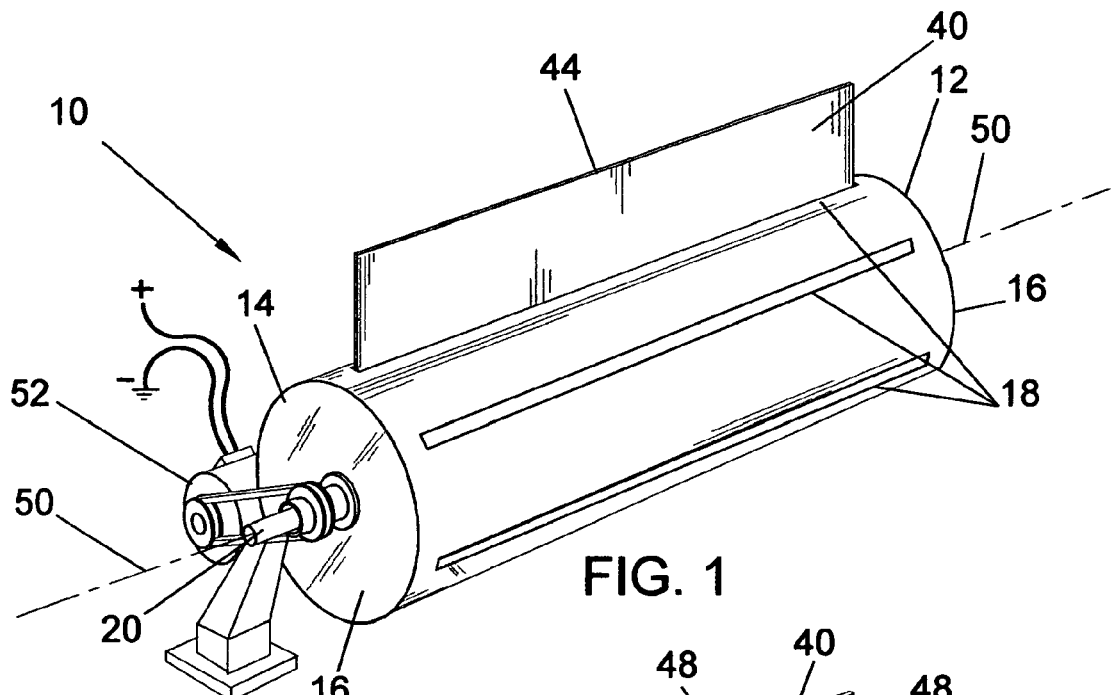
FIG. 1 illustrates a perspective view of a fluid driven energy generator according to an embodiment of the invention.
Figure 2:
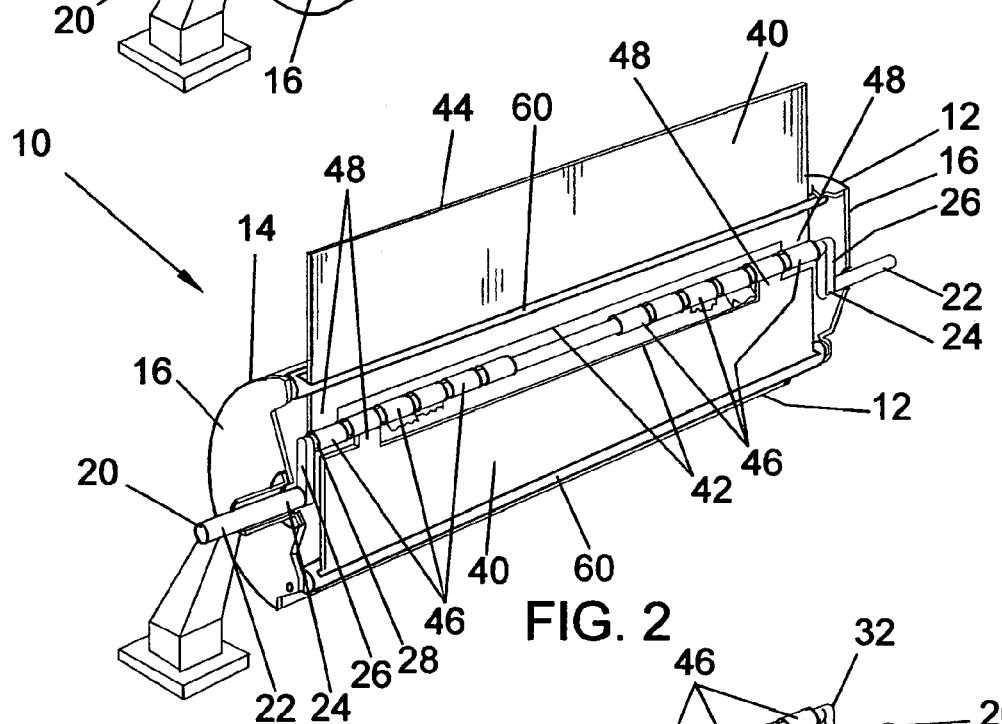
FIG. 2 illustrates a perspective partial cutaway view of a fluid driven energy generator according to an embodiment of the invention.
Figure 3:
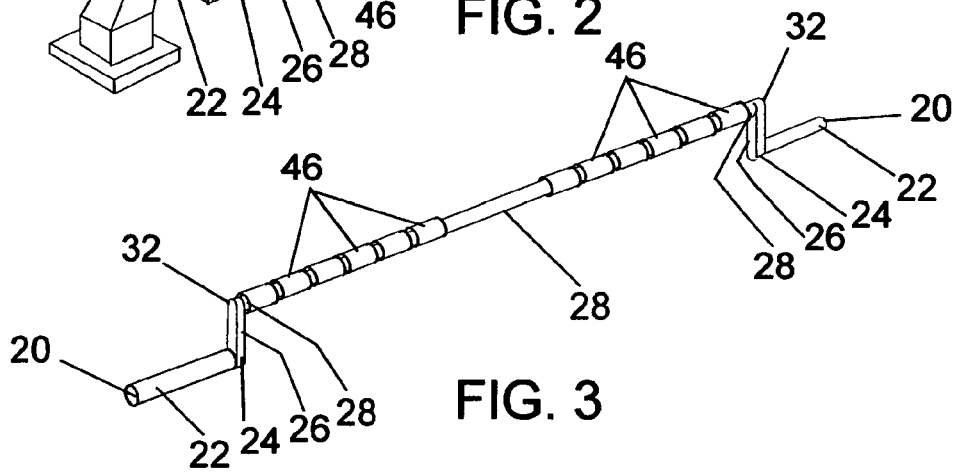
FIG. 3 illustrates a perspective view of a paddle shaft with paddle bearings according to an embodiment of the invention.
Figure 6:
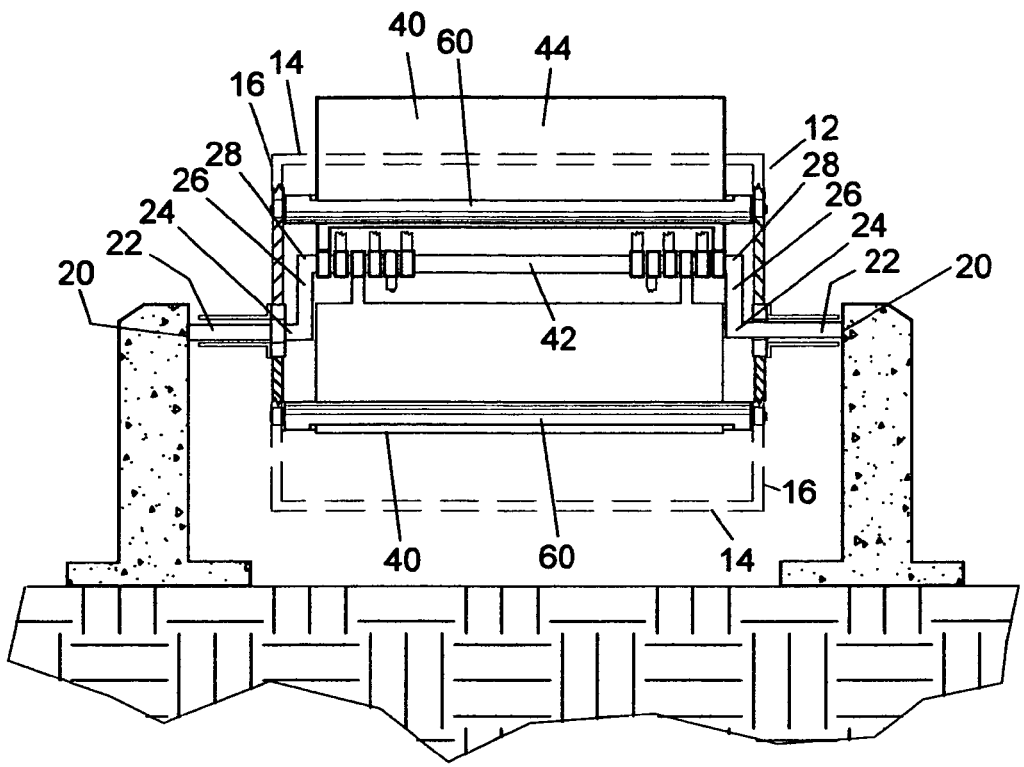
FIG. 6 illustrates a side elevation view of a fluid energy drive generator with the cylindrical enclosure cut away and only two opposed paddles according to an embodiment of the invention.

The following detailed description represents the best currently contemplated modes for carrying out the invention. The description is not to be taken in a limiting sense, but is made merely for the purpose of illustrating the general principles of the invention.

Referring to FIGS. 1 through 6, a fluid driven energy generator 10 may have a generally closed cylindrical enclosure 12 or drum rotatably attached to a shaft 20 along a longitudinal centerline 50 of the enclosure 12. The shaft 20 may have two drive members 22 that are spaced apart along the centerline 50 with each one inserted through and rotatably attached to one of the opposed enclosure ends 16 of the enclosure 12. At an interior end 24 of each drive member 22 an orthogonal member 26 may be attached and a paddle shaft 28 may be attached at each end 30 to a leverage end 32 of each orthogonal member 26.

A plurality of circumferentially spaced paddles 40 may be rotatably attached at a first edge 42 to the paddle shaft 28. The paddles 40 may extend radially outwardly from the paddle shaft 28 with an outer edge 44 positioned to be extended and retracted through a plurality of slots 18 formed in the wall 14 of the enclosure 12. The orthogonal members 26 offset the paddle shaft 28 from the centerline 50 such that as the paddle shaft 28 and paddles 40 rotate with the enclosure 12 the paddles 40 may extend outwardly of the slots 18 as the enclosure wall 14 rotates around a position closest to the paddle shaft 28 and the paddles 40 may retract into the enclosure 12 when the wall 14 may be adjacent to the position furthest from the paddle shaft 28.

As the enclosure 12 and paddles 40 rotate, the paddles 40 will vary in extended and retracted positions because of the orthogonal members 26 offsetting lever arm effect relative to the enclosure 12 rotational centerline 50. The enclosure 12 may be positioned in a fluid flow stream with the orthogonal members 26 perpendicular to the flow direction. Further the orthogonal members 26 may be oriented to extend the paddles 40 outwardly a maximum distance when orthogonal to the direction of flow for a desired rotational direction of the generator 10 and to be fully retracted when orthogonal to the direction of flow that would cause generator 10 rotation opposite the desired direction. This may allow maximum fluid force for rotation in a desired direction due to paddle exposure to the fluid flow and the increase in lever arm effect caused by the orthogonal members 26. The amount of time the paddles 40 may extend outwardly of the wall 14 may be established by the distance of the paddles 40 from the paddle shaft 28 to the outer edge 44.

The paddles 40 may be rotatably attached to the paddle shaft 28 by paddle bearing sleeves 46 that may be attached to paddle projecting elements 48 attached to the first edge 42 of each paddle 40. The paddle projecting elements 48 may be aligned in a serial manner with the paddle bearing sleeves 46 along the paddle shaft 28, as best viewed in FIGS. 2 and 6, to avoid interference between the paddle projecting elements 48. As an alternative the paddle shaft 28 may be rotatably attached to the orthogonal members 26 and the first edge 42 may be directly attached to the paddle shaft 28.

There may be a paddle thrust member 60 attached between the opposed enclosure ends 16 adjacent to each of the slots 18. The thrust member 60 may have the form of a generally closed cylinder with two opposed slots 64 formed in the wall 62 of the thrust member 60. The slots 64 may be sized to allow a paddle 40 to slide therethrough with a small space between the paddle 40 and the edges of the slots 64 openings. The paddle thrust member 60 may be rotatably attached to the enclosure ends 16 by shafts 66 in bearings 68. Rollers 36 may be positioned on each side of the paddle 40 in the thrust member 60 that may serve to receive the force of the fluid flow against the extended paddles 40 to rotate the enclosure 12 and to guide the paddles 40 between the extended and retracted positions.

Figure 7:
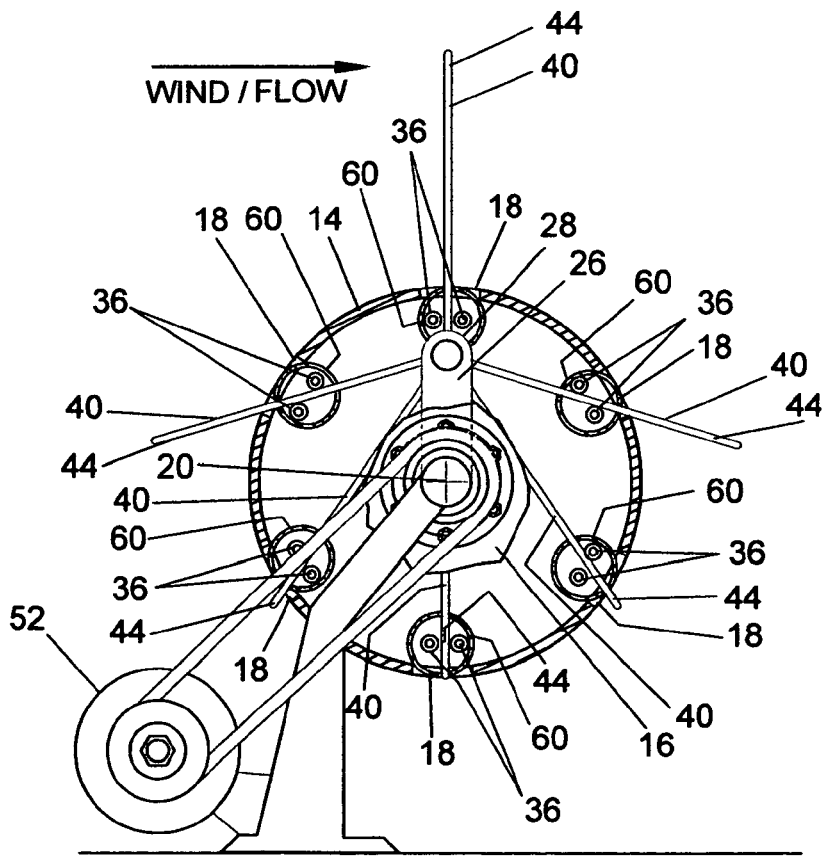
FIG. 7 illustrates an end cross-sectional view of a fluid energy drive generator according to an embodiment of the invention.

The paddle thrust member 60 may be attached in the enclosure 12 adjacent the slots 18, as can be best viewed in FIG. 7. This may cause the wall 62 of the thrust member 60 to partially close the opening of the slots 18 in the enclosure 12 that must be wide enough for the paddles 40 to rotate in and out of the slots 18 as the enclosure 12 and paddles 40 rotate. Minimizing the size of the slot 18 openings may improve the efficiency of the generator 10.

The paddle thrust member 60 has been disclosed as having the form of a generally closed cylinder; however, other forms may be used that as an example may have a wall 62 that in cross section is only a portion of a circumference of a circle. The thrust member 60 may be a thrust shaft 34 attached between the opposed enclosure ends 16 adjacent to each of the slots 18. The thrust shaft 34 may have a plurality of rollers 36 that may serve to receive the force of the fluid flow against the extended paddles to rotate the enclosure 12 and to guide the paddles 40 between the extended and retracted positions. The thrust shaft 34 may have bracket arms 38 attached to position rollers 36 on the opposite side of the paddles 40 relative to the thrust shaft 34 to aid in guiding the movement of the paddles 40. A curved wall 70 may be attached to the thrust shaft 34 and the shafts 66, and may be positioned to be adjacent to the slots 18.

The paddles 40 may be formed of a rigid material structure to allow radial motion for extension and retraction through slots 18 and to capture fluid flow thrust force. The paddles 40 may have a flat or straight form, or a concave form oriented to capture fluid more effectively while extended into the fluid flow stream. The generator 10 may be positioned in the fluid flow path of a venturi channel. The enclosure 12 may be coupled to a generator 52, for example, an electric generator, to rotate the generator 52 to produce power, such as electrical power.

While the invention has been particularly shown and described with respect to the illustrated embodiments thereof, it will be understood by those skilled in the art that the foregoing and other changes in form and details may be made therein without departing from the spirit and scope of the invention.

I claim:

1. An apparatus for converting fluid flow into an alternate energy form comprising:

a generally cylindrical enclosure that has a side wall with a plurality of slots longitudinally formed therein and with two opposed ends;

two drive members of a shaft are spaced apart, positioned longitudinally on a centerline of said enclosure, and rotatably attached each to one of said two opposed ends;

each of said two drive members at an interior end has an orthogonal member attached with each of said orthogonal members approximately parallel;

a paddle shaft is attached at each end to each of said orthogonal members at a leverage end;

a plurality of paddles circumferentially spaced and radially attached at a first edge to rotate on said paddle shaft with an outer edge disposed to allow extension and retraction through one of said slots; and a paddle thrust member that has a curved wall with a paddle slot therein and a plurality of rollers disposed on a thrust shaft is disposed adjacent each of said slots of said cylindrical enclosure, and said paddle thrust member is rotatably attached at each end of said thrust shaft to each of said opposed ends interior to said enclosure.

2. The apparatus as in claim 1 wherein said enclosure has a polygonal cross-sectional wall.

3. The apparatus as in claim 1 wherein said enclosure has a circular cross-sectional wall.

4. The apparatus as in claim 1 wherein said plurality of slots are parallel to said centerline.

5. The apparatus as in claim 1 wherein:

said curved wall is generally the form of a tube with closed ends;

said tube has two opposed paddle slots longitudinal disposed therein;

said thrust shaft is a two member shaft with each of said members attached to one of said closed ends of said tube; and said plurality of rollers are attached to said curved wall interior to said tube.

6. The apparatus as in claim 5 wherein a bracket arm is attached to said thrust shaft disposed to position a roller adjacent one of said paddles on a side opposite said thrust shaft.

7. The apparatus as in claim 1 wherein said plurality of paddles is attached to said paddle shaft with at least two paddle projecting elements on said first edge of each of said plurality of paddles attached to at least two paddle bearing sleeves rotatably disposed on said paddle shaft.

8. The apparatus as in claim 7 wherein said paddle bearing sleeves are disposed serially on said paddle shaft and said at least two paddle projecting elements for each of said paddles are disposed for attachment to said paddle bearing sleeves to avoid interference between adjacent paddles.

9. The apparatus as in claim 1 wherein said paddle shaft is rotatably attached to said orthogonal members and said plurality of paddles are attached at said first edge to said paddle shaft.

10. The apparatus as in claim 1 wherein an electric generator is coupled with said enclosure.

* * * * *